United States Patent
Nakada et al.

(10) Patent No.: US 7,803,049 B2
(45) Date of Patent: Sep. 28, 2010

(54) GAME APPARATUS AND STORAGE MEDIUM STORING GAME PROGRAM

(75) Inventors: Ryuichi Nakada, Kyoto (JP); Hiroshi Momose, Kyoto (JP); Takehiko Hosokawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1125 days.

(21) Appl. No.: 11/288,399

(22) Filed: Nov. 29, 2005

(65) Prior Publication Data

US 2006/0116203 A1 Jun. 1, 2006

(30) Foreign Application Priority Data

Dec. 1, 2004 (JP) ............................. 2004-348249

(51) Int. Cl.
*A63F 13/00* (2006.01)
(52) U.S. Cl. ............................... 463/36; 463/6; 463/37; 463/38
(58) Field of Classification Search .................... 463/36, 463/37, 6, 38; 345/173, 169, 163, 156; 708/141; 382/182
See application file for complete search history.

(56) References Cited

U.S. PATENT DOCUMENTS 5,596,698 A * 1/1997 Morgan ....................... 715/863

| 2001/0031665 | A1* | 10/2001 | Taho et al. | 463/43 |
|---|---|---|---|---|
| 2003/0095096 | A1* | 5/2003 | Robbin et al. | 345/156 |
| 2003/0218064 | A1* | 11/2003 | Conner et al. | 235/439 |
| 2004/0193413 | A1* | 9/2004 | Wilson et al. | 704/243 |
| 2006/0073862 | A1* | 4/2006 | Shinoda et al. | 463/1 |

FOREIGN PATENT DOCUMENTS

| JP | 6-208671 | 7/1994 |
|---|---|---|
| JP | 2002-939 | 1/2002 |
| JP | 2002-073249 | 3/2002 |
| JP | 2002000939 | * 8/2002 |

* cited by examiner

*Primary Examiner*—Peter DungBa Vo
*Assistant Examiner*—Masud Ahmed
(74) *Attorney, Agent, or Firm*—Nixon & Vanderhye P.C.

(57) ABSTRACT

A game apparatus includes a display and a touch panel provided thereon. A CPU core displays a game screen on the display. A user draw a circular arc path on the touch panel by continuously touching the touch panel with a stick or the like. In either case of continuous inputs so as to draw a clockwise circular arc path in a right-hander mode or continuous inputs so as to draw a counterclockwise circular arc path in a left-hander mode, it is concluded that the same input operations have been carried out. Accordingly, a user character is moved to the right in proportion to a predetermined angle in the right-hander mode, and the user character is moved to the left in proportion to the predetermined angle in the left-hander mode.

21 Claims, 13 Drawing Sheets

SCREEN FOR RIGHT-HANDER (A)

(B)

(A)

(B)

GAME APPARATUS AND STORAGE MEDIUM STORING GAME PROGRAM

CROSS REFERENCE TO RELATED APPLICATION

The disclosure of Japanese Patent Application No. 2004-348249 is incorporated herein by reference.

TECHNICAL FIELD

The exemplary embodiments disclosed herein relate to a game apparatus and a storage medium storing a game program. More specifically, the exemplary embodiments disclosed herein to a game apparatus that makes it possible to operate a character by continuously designating different positions in a game screen to form a path with the use of a pointing device such as a touch panel or a mouse, and a storage medium storing a game program used for the game apparatus.

BACKGROUND AND SUMMARY

Japanese Patent Laying-open No. 6-208671 [G07D 9/00 G06F 3/14 15/30] discloses one example of an information processing apparatus equipped with a touch panel screen. According to the prior art of Japanese Patent Laying-open No. 6-208671, if the user firstly designates a right-of-center position on the touch panel, the next input area is displayed on the right side of the screen. If the user firstly designates a left-of-center position, the next input area is displayed on the left side of the screen. Therefore, it is possible to display an operating screen that is easy for the user to operate depending on his/her dominant hand.

Also, Japanese Patent Laying-open No. 2002-939 [A63F 13/00 G06F 3/033] discloses one example of an electronic game in which a game screen is provided with a touch panel that acts directly on the game screen. According to Japanese Patent Laying-open No. 2002-939, a predetermined operation is carried out on the basis of the path of continuously input touches.

In Japanese Patent Laying-open No. 6-208671, an input selection area is just displayed on the left side or right side of the screen. This prior art can be applied to, for example, automatic teller machines that allows transactions to be conducted by easy operations. However, there is a problem in applying the prior art to such an electronic game as Japanese Patent Laying-open No. 2002-939.

More specifically, in Japanese Patent Laying-open No. 2002-939, when touch inputs have been continuously performed in such a manner as to form a straight line path, for example, it is determined that the golf club has been swung, and thus the golf game progresses. In the case of performing an operation according to the path of touch inputs as stated above, an input operation does not necessarily become easier only by placing an input area on the left side or right side of the screen as described in Japanese Patent Laying-open No. 6-208671.

For example, if a game operation is carried out by continuously performing touch inputs in such a manner as to draw a circle or arc in a right-handed (clockwise) direction, the right-handed user can make the game progress without any problem. However, it is considerably more difficult for the left-handed user to perform continuous touch inputs in such a manner as to draw a circle or arc in that direction. Therefore, in such a case where complicated input operations are required to perform a game, it is not always possible to provide ease of input according to the user's dominant hand just by changing the position of an input area between the right and left sides of the screen as done in Japanese Patent Laying-open No. 6-208671.

Consequently, it is inevitable that some kinds of games may be advantageous or disadvantageous to the user, depending on whether he/she is a right-hander or left-hander.

Therefore, a feature of certain exemplary embodiments relates to providing a novel game apparatus and a storage medium storing a game program.

Another feature of certain exemplary embodiments relate to providing a game apparatus and a storage medium storing a game program that, in performing a game in which a path is drawn according to continuous input operations by means of a pointing device, makes it possible to change an input operation so as to become easier for the user to perform, according to his/her dominant hand.

Certain exemplary embodiments provide a game apparatus that is equipped with a display for displaying a game screen and that requires a pointing device for drawing a path by continuously designating different positions in the game screen. The game apparatus comprises a select screen displaying means that displays on the display a select screen for selecting a first input mode or a second input mode, a first determining means for, when the first input mode is selected, determining whether or not a path extending in a first direction is drawn by the pointing device, a second determining means for, when the second input mode is selected, determining whether or not a path extending in a second direction different from the first direction is drawn by the pointing device, and a game process means for executing a common game process in accordance with result of determination by the first determining means or result of determination by the second determining means.

According to certain exemplary embodiments, a game apparatus (10: a reference numeral indicative of a corresponding component in the embodiments. The same applies to the following reference numerals.) includes a display (14) and also includes a touch panel (22) as a pointing device provided on the display, for example. A game processor, e.g., a CPU core (42) and step S1 performed thereby function as a select screen displaying means. The select screen displaying means (42, S1) displays on the display a mode select screen for the user to select the first input mode or the second input mode.

The CPU core (42) and step S49 performed thereby constitute the first determining means, and the CPU core (42) and step S51 performed thereby constitute the second determining means. When the user selects the first input mode, the first determining means determines whether or not a path extending in a first direction is drawn by the pointing device. When the user selects the second input mode, the second determining means determines whether or not a path extending in a second direction different from the first direction is drawn by the pointing device.

The game process means is formed by the CPU core (42) and steps S53 and S55 performed thereby, for example, and executes a common game process in either case where result of determination by the first determining means is obtained or result of determination by the second determining means is obtained.

Thus, according to certain exemplary embodiments, the same or common game process is executed in either case of selecting the first input mode or selecting the second input mode. Accordingly, the same game can be played even though the input mode is changed for making input easier to perform.

Certain exemplary embodiments relate to a game apparatus that further comprise a game screen displaying means for displaying a first game screen on the display when the first input mode is selected and displaying a second game screen on the display when the second input mode is selected.

In certain exemplary embodiments, the CPU core (42) displays the first game screen on the display (12, 14) by performing step S19, and displays the second game screen by performing steps S17 and S19, for example. This makes it possible to display an optimum game screen according to the first input mode or the second input mode.

Certain exemplary embodiments provide a game apparatus, in which the first input mode is a right-handed input mode and the second input mode is a left-handed input mode.

In certain exemplary embodiments, the select screen displaying means allows the user to select the right-handed input mode or the left-handed input mode. Thus, it is possible to both the right-handed user and the left-handed user can select an input mode easier for him/her to operate.

Certain exemplary embodiments provide a game apparatus in which the path extending in the first direction is a right-handed circular arc path and the path extending in the second direction is left-handed circular arc path.

According to certain exemplary embodiments, the right-handed user may draw a right-handed circular arc path and the left-handed user may draw a left-handed circular arc path. Thus, in making the user draw a circular arc path, it is possible to provide the user with the same level of difficulty, regardless of his/her dominant hand.

Certain exemplary embodiments provide a game apparatus in which the pointing device includes a touch panel provided to the display.

In certain exemplary embodiments, the user can perform continuous position designation by providing touch inputs to the touch panel with the use of a stick (24), for example.

Certain exemplary embodiments provide a storage medium storing a game program for a game apparatus that is equipped with a display for displaying on the display a game screen and that requires a pointing device for drawing a path by continuously designating different positions in the game screen. The game program allows a game processor to perform a select screen displaying step of displaying a select screen for selecting a first input mode or a second input mode, a first determining step of, when the first input mode is selected, determining whether or not a path extending in a first direction is drawn by the pointing device, a second determining step of, when the second input mode is selected, determining whether or not a path extending in a second direction different from the first direction is drawn by the pointing device, and a common game process step of executing a common game process in accordance with result of determination in the first determining step and result of determination in the second determining step.

Certain exemplary embodiments provide a storage medium in which the program further allows the game processor to perform a game screen displaying step of displaying a first game screen on the display when the first input mode is selected and displaying a second game screen on the display when the second input mode is selected.

Certain exemplary embodiments provide a storage medium in which the first input mode is a right-handed input mode and the second input mode is a left-handed input mode.

Certain exemplary embodiments provide a storage medium in which the path extending in the first direction is a right-handed circular arc path and the path extending in the second direction is left-handed circular arc path.

According to certain exemplary embodiments, it is possible to eliminate an advantage or disadvantage condition that may occur depending on whether the user is a right-hander or a left-hander, for example, even in a game apparatus that requires relatively complicated continuous position designating operations. This is because, when the user selects an input mode easier for him/her to operate, the requirement for path inputting by the pointing device is changed accordingly.

The above described objects and other objects, features, aspects and advantages of certain exemplary embodiments will become more apparent from the following detailed description of the present invention when taken in conjunction with the accompanying drawings.

DETAILED DESCRIPTION

Figure 1:
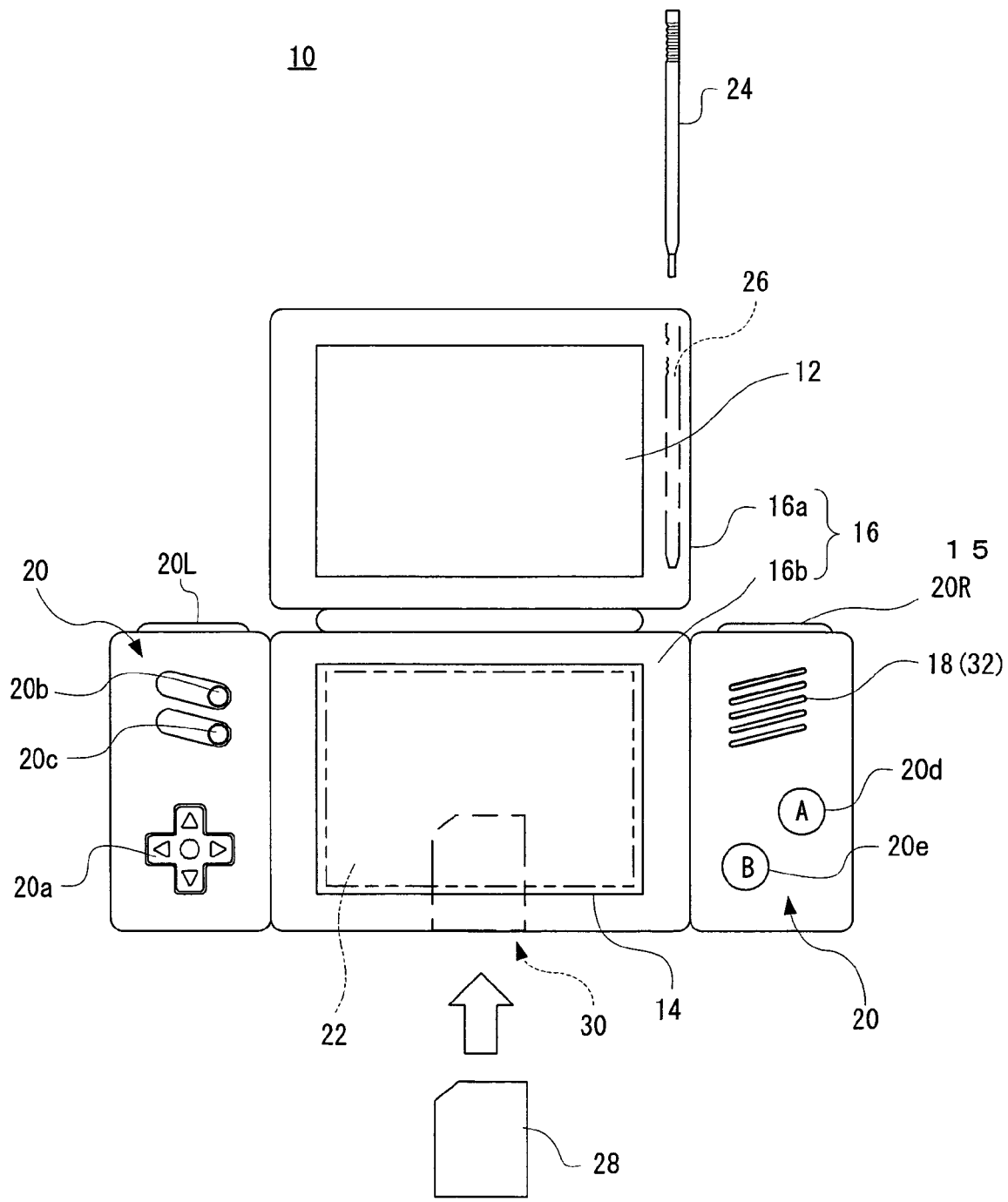
FIG. 1 is an illustrative view showing one example of a game apparatus in accordance with an exemplary embodiment.

Referring to FIG. 1, a game apparatus 10 of an exemplary embodiment includes a first liquid crystal display (LCD) 12 and a second LCD 14. The LCD 12 and the LCD 14 are provided on a housing 16 so as to be arranged in a predetermined position. In this exemplary embodiment, the housing 16 consists of an upper housing 16*a* and a lower housing 16*b*, and the LCD 12 is provided on the upper housing 16*a* while the LCD 14 is provided on the lower housing 16*b*. Accordingly, the LCD 12 and the LCD 14 are closely arranged so as to be longitudinally (vertically) parallel with each other.

It is noted that although the LCD is utilized as display in this embodiment, an EL (Electronic Luminescence) display, a plasma display, etc. may be used in place of the LCD.

As can be understood from FIG. 1, the upper housing 16*a* has a plane shape a little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound release hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to fold such that the display surface of the LCD 12 and the display surface of the LCD 14 are face to face with each other, it is possible to prevent the display surface of the LCD 12 and the display surface of the LCD 14 from being damaged or flawed, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction indicating switch 20a functions as digital joystick, and is utilized for indicating a moving direction of a user character (or user object) to be operated by a user, indicating a moving direction of a cursor and so forth by operating one of four depression portions. The start switch 20b is formed by a push button, and is utilized for starting (restarting), temporarily stopping (pausing) a game, and so forth. The select switch 20c is formed by the push button, and utilized for selecting a game mode, etc.

The action switch 20d, that is, the A button is a push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction for obtaining an item, selecting and determining arms or command, etc. The action switch 20e, that is, the B button is a push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as subsidiary of the A button 20d and the B button 20e.

The LCD 14 is provided with a touch panel 22 on a top surface. As the touch panel 22, any one of resistive film type, optical (infrared) type and electrostatic capacity coupling type can be employed, for example.

In response to an operation by depressing, stroking, touching (hereinafter referred to simply as "depressing") with a stick 24, a pen (stylus pen), or a finger (hereinafter referred to as "stick 24 or the like" in some cases) on a top surface of the touch panel 22, the touch panel 22 detects coordinates of a operating position of the stick 24 or the like and outputs coordinates data corresponding to the detected coordinates. Besides, a touch of the stick 24 or the like by the user on the touch panel 22 is called "touch-on", and moving of the stick 24 or the like off the touch panel 22 is referred to as "touch-off".

It is noted that in this exemplary embodiment, a resolution of the display surface of the LCD 14 is 256 dots×192 dots (this is true or roughly true for the LCD 12), and a detection accuracy of a detection surface of the touch panel 22 is also rendered 256 dots×192 dots in correspondence to the resolution of the display surface. However, detection accuracy of the touch panel 22 may be lower than the resolution of the display surface, or higher than it.

In playing a game, the LCD 12 and the LCD 14 display different game screens. In a competition game, for example, the one LCD 12, for example, may display the entire screen, and the other LCD 14, for example, may display a character capable of being operated by a user (user character).

The user, by operating the touch panel 22 with the stick 24 or the like, can specify a character image of user character, enemy character, item character, graphic information, icon or the like to be displayed on the screen of the LCD 14, and select a command. Also, the user can change an orientation of a virtual camera (viewpoint) provided in a three-dimensional game space and designate a scrolling (gradually moving screen display) direction of a game screen (map).

Additionally, depending on the kind of the game, it is possible to perform other various input designations. Examples are to select or operate an icon displayed on the LCD 14 and to give a coordinate input instruction.

Thus, the game apparatus 10 has the LCD 12 and the LCD 14 as display portion of two screens, and the touch panel 22 is provided on an upper surface of any one of them (LCD 14 in this embodiment). Thus, the game apparatus 10 has the two screens (12, 14) and two systems of the operating portions (20, 22).

Furthermore, in this exemplary embodiment, the stick 24 can be inserted into a housing portion (housing slot) 26 provided in proximity to a side surface (right side surface) of the upper housing 16a, for example, and taken out therefrom as necessary. It is noted that in a case of not preparing the stick 24, it is not necessary to provide the housing portion 26.

Also, the game apparatus 10 includes a memory card (or cartridge) 28, and the memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound release hole 18 in the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
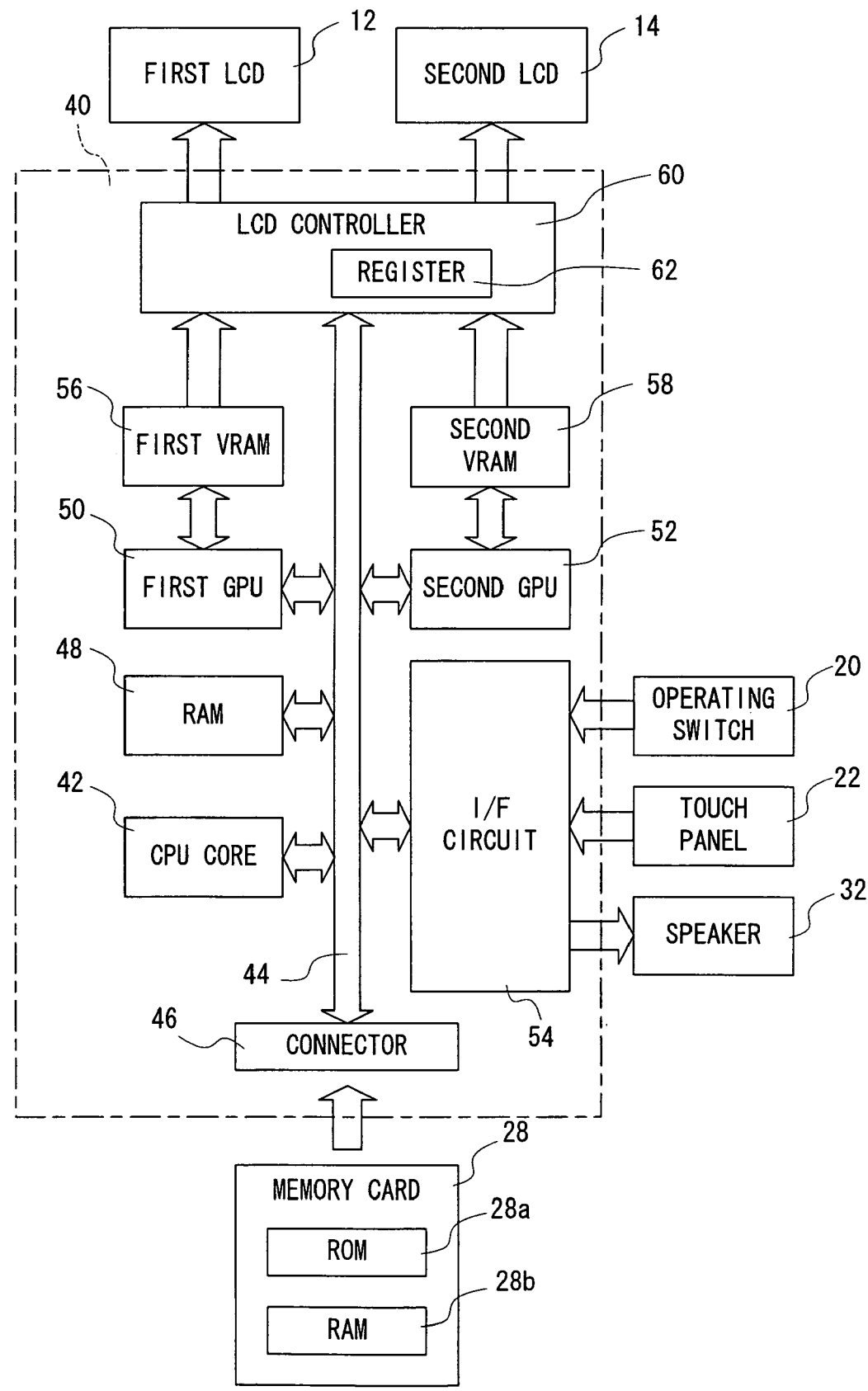
FIG. 2 is a block diagram showing the electrical structure of the game apparatus shown in FIG. 1.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. are mounted. The CPU core 42 equates to a game processor and is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus, and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, background image, item image, icon (button) image, etc.), data of sound (music) necessary for the game (sound data), etc. The RAM (backup RAM) 28b stores (saves) proceeding data and result data of the game.

Besides, the game apparatus 10 makes it possible to play a game whose contents are fixed by the memory card 28, and also can be used for purposes other than game playing. For example, by displaying a keyboard or key patterns on the second LCD 14 and touching (operating) the touch panel 22 above the keyboard to specify or designate the key patterns, it is possible to make the game apparatus 10 function as an information processing apparatus for inputting characters, numbers, symbols, etc. (hereinafter referred to as collectively "characters" in some cases) specified or designated by the keyboard or the key patterns. In this case, instead of a game program, an information processing program is stored in the ROM 28a.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing data (game data and flag data) temporarily generated in correspondence with a progress of the game in the RAM 48. This CPU core 42 functions as a processor, but, in some cases, the above mentioned GPUs 50 and 52 are also called a processor or form a part of the processor.

It is noted that such the game program, the image data, the sound data, etc. are loaded from the ROM 28a entirely at a time, or partially and sequentially as necessary so as to be stored (loaded) into the RAM 48.

Additionally, the ROM 28a of the memory card 28 stores some programs for applications other than games, and image data required for execution of those applications. Also, the ROM 28a may store sound (music) data where necessary. In this case, the game apparatus 10 executes those applications.

Each of the GPU 50 and the GPU 52 forms a part of a rendering means, is constructed by a single chip ASIC, for example, and receives a graphics command (image generating command) from the CPU core 42 to generate image data according to the graphics command. It is noted that the CPU core 42 applies to each of the GPU 50 and the GPU 52 an image generating program (included in the game program) required to generate the image data in addition to the graphics command.

It is noted that each of the GPU 50 and the GPU 52 gains access to the RAM 48 to fetch data (image data: data such as polygon, texture, etc.) required to execute the construction command by the GPU 50 and the GPU 52.

Furthermore, the GPU 50 is connected with a first video RAM (hereinafter, referred to as "VRAM") 56, and the GPU 52 is connected with a second VRAM 58. The GPU 50 and the GPU 52 access the first VRAM 56 and the second VRAM 58, respectively, to obtain data required for execution of the image generating command by the GPU 50 and the GPU 52 (image data: character data, texture data, etc.).

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the image data generated by the GPU 50 to the LCD 12, and outputs the game image data generated by the GPU 52 to the LCD 14 in a case that the data value of the register 62 is "0". Furthermore, the LCD controller 60 outputs the game image data generated by the GPU 50 to the LCD 14, and outputs the game image data generated by the GPU 52 to the LCD 12 in a case that the data value of the register 62 is "1".

Additionally, the LCD controller 60 reads image data directly from the VRAM 56 and the VRAM 58, and also reads image data from the VRAM 56 and the VRAM 58 via the GPU 50 and the GPU 52.

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, the coordinates data from the touch panel 22 is input to the CPU core 42 via the I/F circuit 54. In addition, the CPU core 42 reads the sound data necessary for the game such as game music (BGM), sound effects and voices of game characters (onomatopoeic sound), etc. from the RAM 48, and outputs it from the speaker 32 via the I/F circuit 54.

Figure 3:
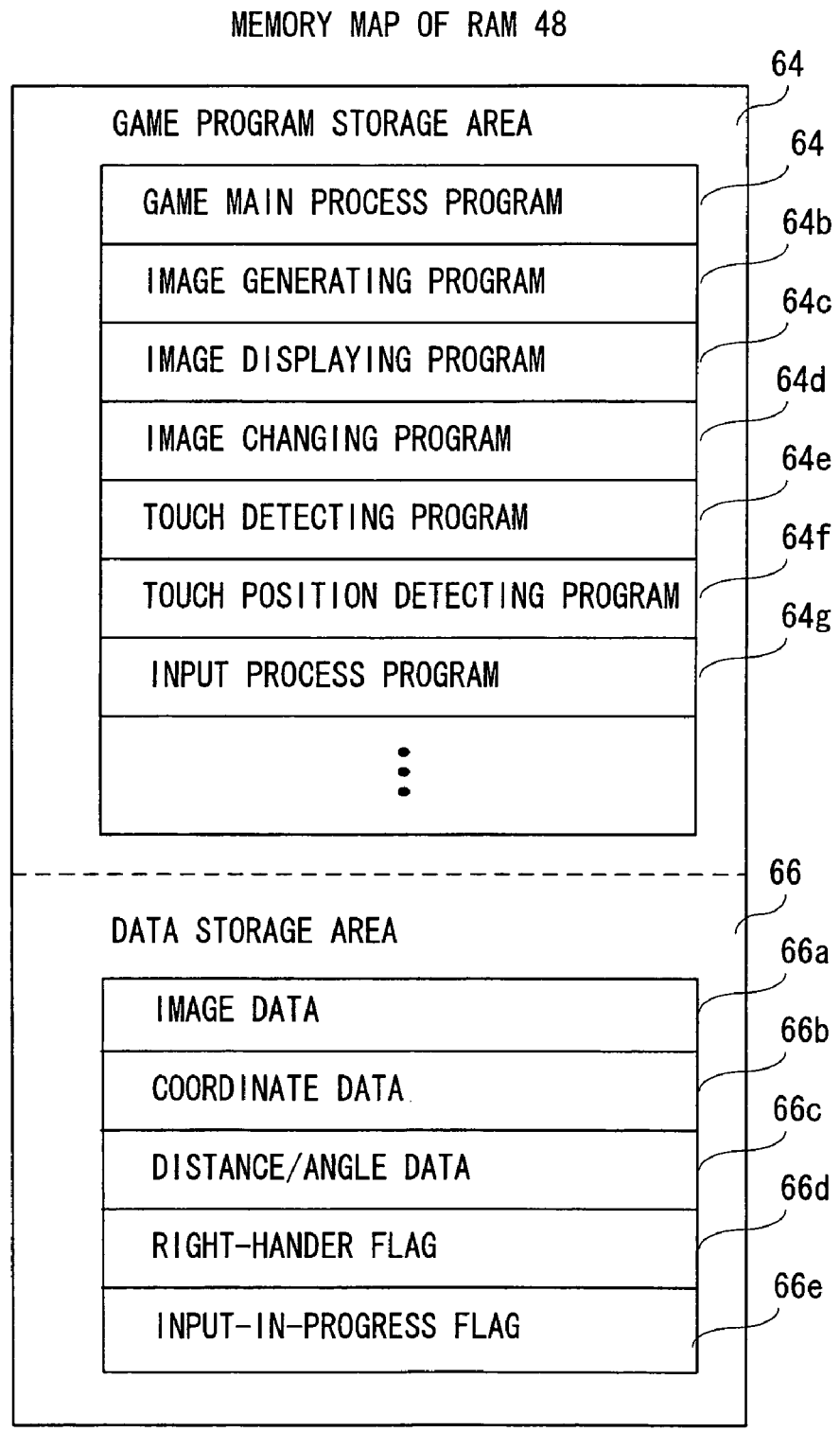
FIG. 3 is an illustrative view showing one example of a memory map of a RAM provided to the game apparatus shown in FIG. 2.

FIG. 3 illustrates a memory map of the RAM 48 of FIG. 2. Formed in the RAM 48 are a program storage area 64 for storing a program downloaded from the ROM 28a and a data storage area 66 for storing data downloaded from the same ROM 28a.

The program storage area 64 includes a main process program storage area 64a for storing a main process program, an image generating program storage area 64b for storing an image generating program for generating image data for game image or mode select screen, an image display program storage area 64c for storing an image display program for displaying a game image, etc. on the LCDs 12 and 14 according to the above mentioned image data, an image changing program storage area 64d for storing an image changing program for changing the game image, etc., a touch detecting program storage area 64e for storing a touch detecting program for detecting a touch-on to or a touch-off from the touch panel 22, a touch position detecting program storage area 64f for storing a touch position detecting program, and an input processing program storage area 64g for storing an input processing program.

Figure 4:
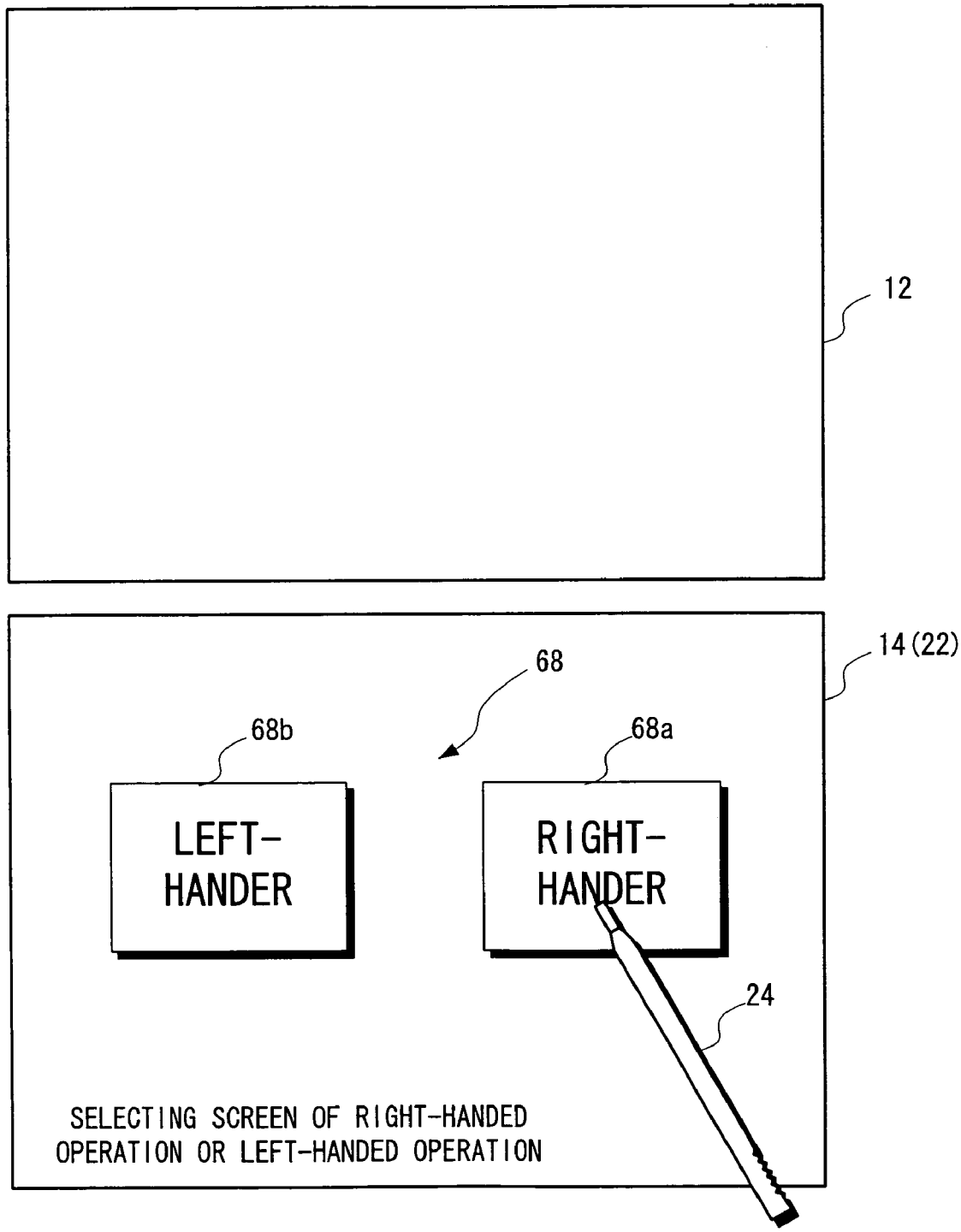
FIG. 4 is an illustrative view showing one example of a mode select screen displayed on a second LCD of the game apparatus shown in FIG. 1.
Figure 5:
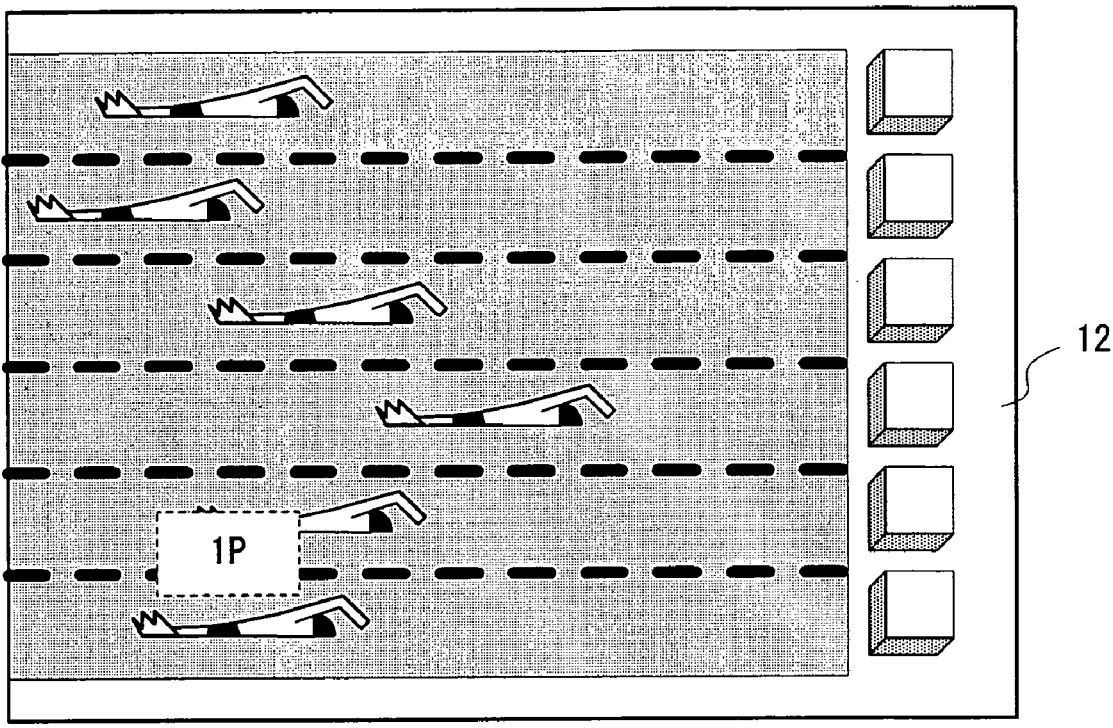
FIG. 5 is an illustrative view showing examples of game screens displayed on two LCDs in a right-handed mode.
Figure 5:
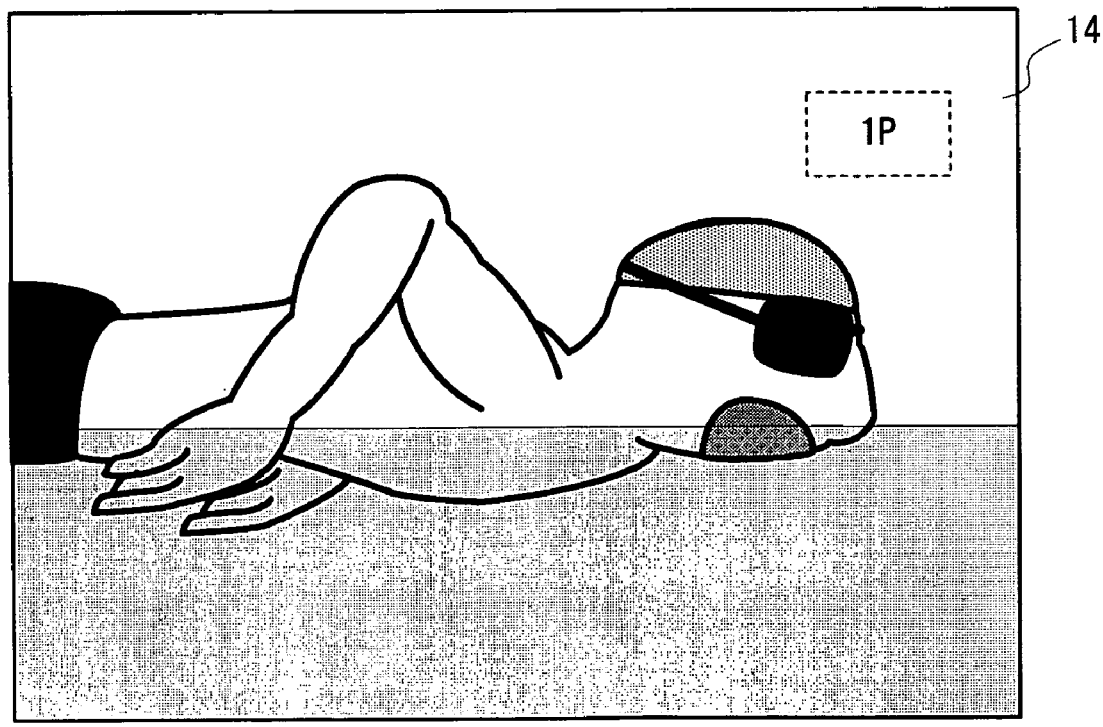
Figure 7:
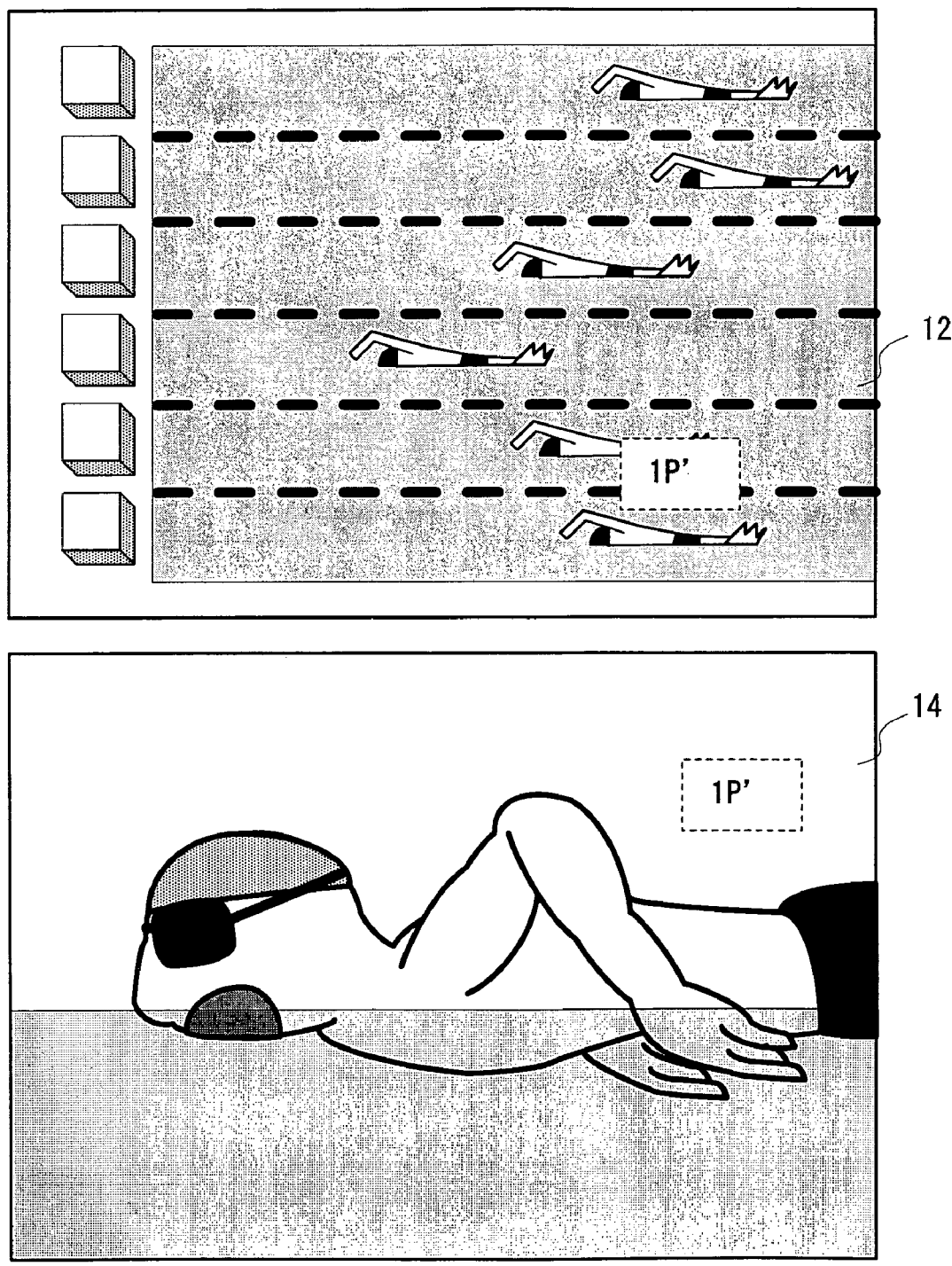
FIG. 7 is an illustrative view showing examples of game screens displayed on the two LCDs in a left-handed mode.
Figure 8:
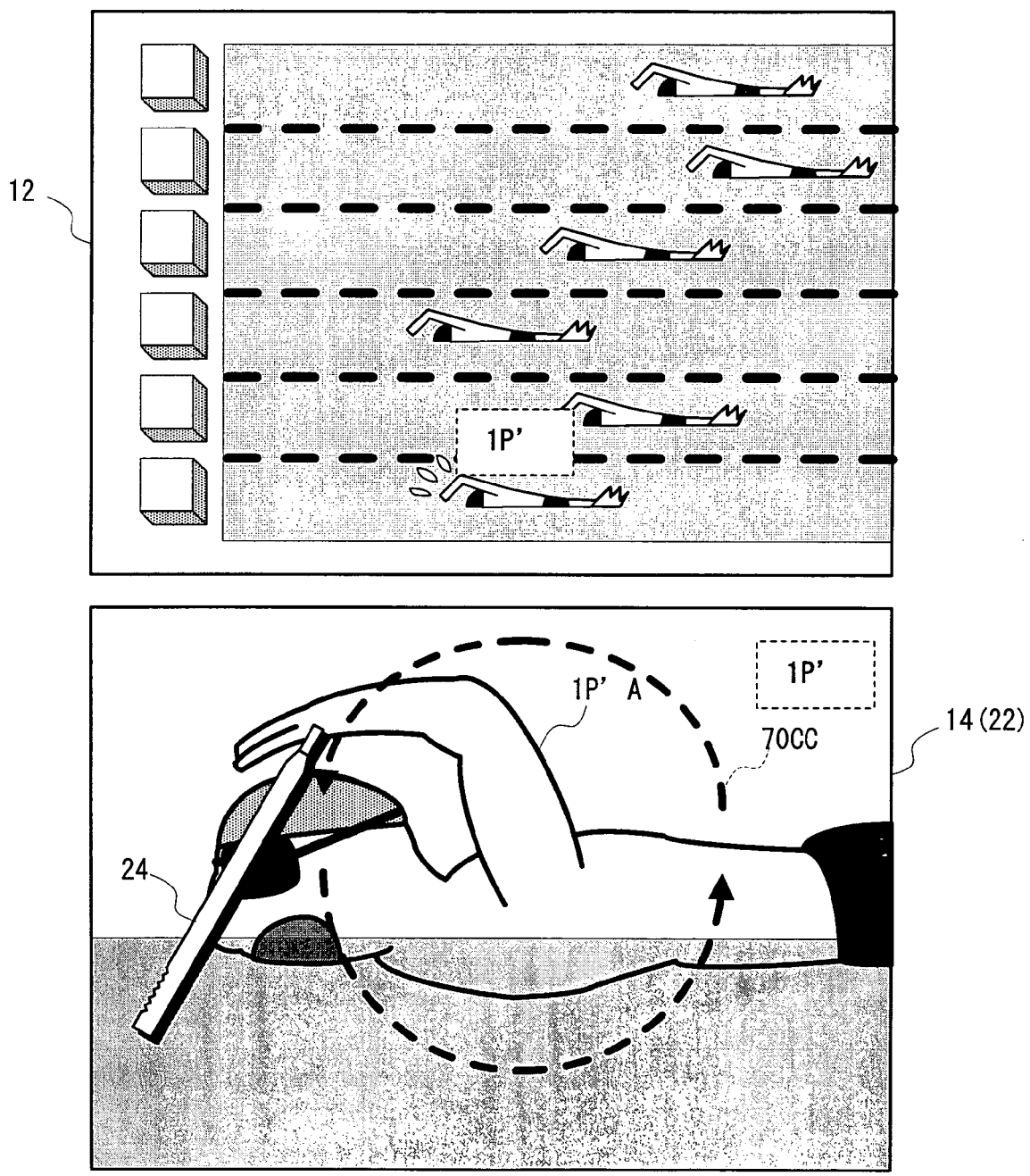
FIG. 8 is an illustrative view showing a relationship between an arm of a user character and a circular arc path of continuous touch inputs in the left-handed mode.

The main process program is a program for controlling a main process operation described later in detail with reference to FIG. 10. The image generating program is a program for displaying a mode select screen as shown in FIG. 4 on the second LCD 14 or generating image data for displaying a game screen as shown in FIG. 5 or FIG. 7 on the upper and lower LCDs 12 and 14. The image displaying program is a program for displaying the mode selecting screen and the game screen on the LCDs 12 and 14, based on the image data. The image changing program is a program for making a change to a game character (object) displayed in the game screen according to a touch input by the user's input operation, a touch input using the stick 24 or the like or an input operation through the operating switch 20 (20*a* to 20*e*, 20L, 20R), for example. The touch detecting program is a program for detecting whether or not the stick 24 or the like is in touch with the touch panel 22 (touch-on or touch-off). The touch position detecting program is a program for detecting the touch position of the stick 24 or the like on the touch panel 22, i.e., the touch position on the second LCD 14 (coordinate position). The input process program is a program for performing a process according to the input operation by the stick 24 or the like, described later with reference to FIG. 10 and FIG. 11.

In a data storage area 66, an image data storage area 66*a* stores background images and object (character) images to be displayed in the above mentioned game screen, and also stores image data including an image of the select button to be displayed in the mode select screen. A coordinate data storage area 66*b* stores temporarily the coordinate position of a touch on the touch panel 22 by the stick 24 or the like, that is, the coordinate data on the coordinate position designated by the pointing device. A distance/angle data area 66*c* stores temporarily the data on a distance (R) and an angle (θ) calculated by an input process described later. A right-hander flag 66*d* is a flag that is set when right-hander is selected ("1" is set) in the mode select screen of FIG. 4. The input-in-progress flag 66*e* is a flag that indicates whether or not continuous touch inputs are being performed by the stick 24 or the like, that is, whether or not continuous position inputs are being performed by the pointing device. This flag is set while continuous inputs are being performed.

Here, the mode select screen is described with reference to FIG. 4. The mode select screen is displayed on the second LCD 14, not on the first LCD 12. The mode selecting means 68 displays a right-hander select button 68*a* and a left-hander select button 68*b* so as to allow the user to select one of them by using the touch panel 22 and the stick 24 or the like. That is, the mode select screen 68 is a screen for selecting a right-hander mode or a left-hander mode in this exemplary embodiment. However, it is possible to make the user select not only the input modes based on his/her dominant hand but also any other input modes.

In order to select the mode in the mode select screen in FIG. 4, the user touches the right-hander button 68*a* or the left-hander button 68*b* on the touch panel 22 with the stick 24 or the like.

Next, an overview of a game is provided below with reference to FIG. 5 to FIG. 8.

FIG. 5 shows one example of a game screen that appears when the right-hander mode is selected in the above mentioned mode select screen. The game described in relation to this exemplary embodiment is a kind of race game in which a plurality of characters including user-operated characters or objects (they are characters or objects capable of being operated by the user and called user characters or user objects.) swim competitively. However, the specific contents of the game are not limited to such a swimming game as described here.

The upper LCD 12 displays the entire game screen that contains six game characters including a user character, the one shown with "1P" in FIG. 5, and a background image indicative of a swimming pool in which those characters have a competitive race (including water and course ropes in the pool and starting blocks). The lower LCD 14 displays a user character 1P. Since FIG. 5 shows a game screen with the right-hander mode selected, the characters in the game screen moves to the right.

Figure 6:
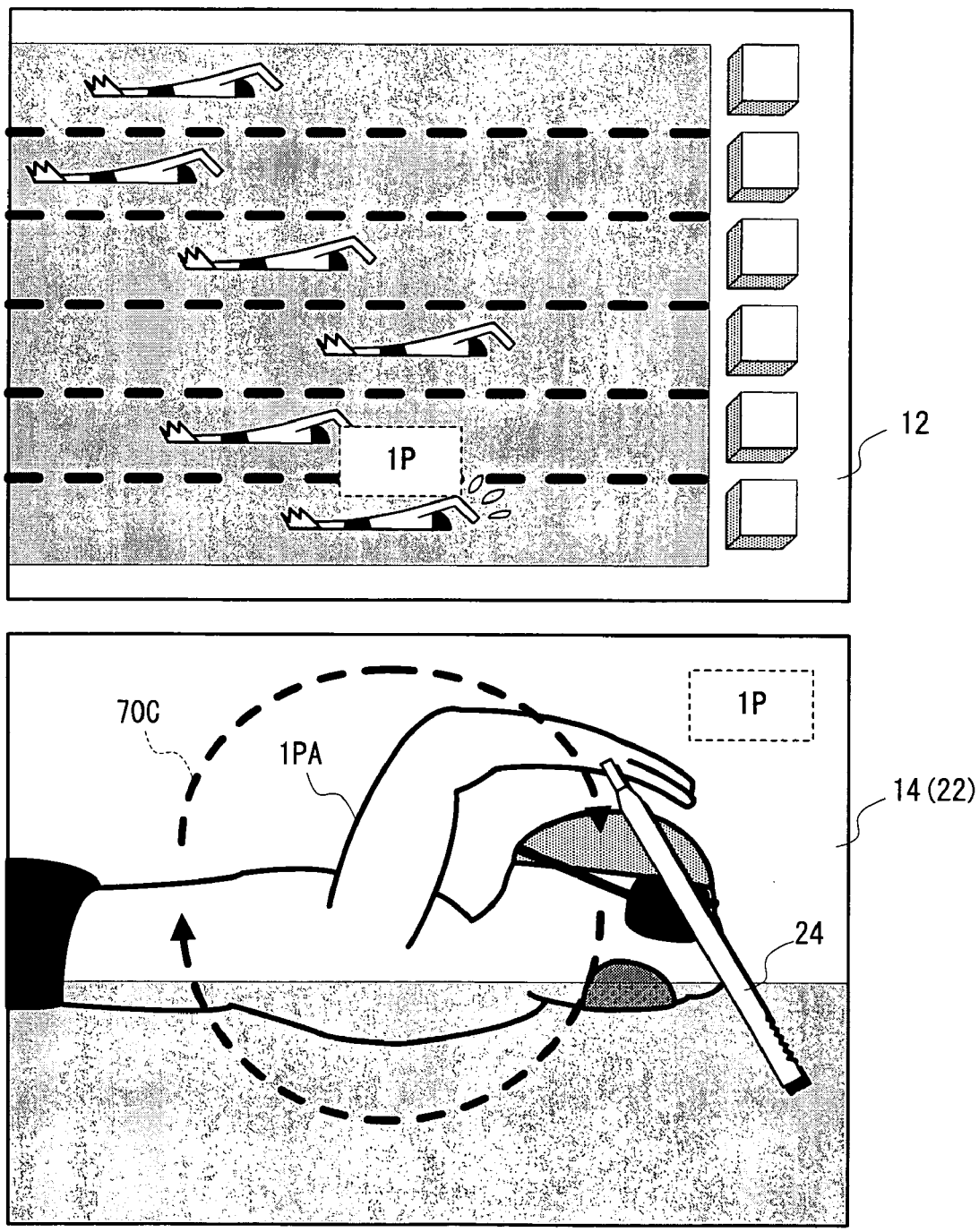
FIG. 6 is an illustrative view showing a relationship between an arm of a user character and a circular arc path of continuous touch inputs in the right-handed mode.

FIG. 6 illustrates a screen in which the user character 1P is operated by touching the touch panel with the stick 24 or the like. By touching the touch panel 22 with the stick 24 or the like at the position of a hand 1PA of the only one character 1P displayed on the lower LCD 14 and providing a clockwise rotary input to the touch panel 22 through the movement of the stick 24 or the like in the right-handed (clockwise) direction so as to draw a circle 70C indicated by dotted lines, the image of the user character changes in such a manner that the hand 1PA rotates in keeping with the rotary input. At the same time, the user character 1P displayed in the entire game screen on the upper LCD 12 is changed so as to move to the right. The more quickly the rotary input is given, the higher the moving speed of the user character 1P becomes, and thus the user character reaches fast the goal on the right of the entire game screen. That is, the game of this exemplary embodiment is a game in which, for competition with other characters, the moving speed of the user character is increased by rotating the user character's arm or hand as fast as possible through continuous touches with the stick 24 or the like on the touch panel 22.

If the left-hander mode is selected in the mode select screen of FIG. 4, game screens shown in FIG. 7 are displayed on the two LCDs 12 and 14. The upper LCD 12 displays the entire game screen that contains six game characters including a user character, the one shown with "1P'" in FIG. 7, and a background image indicative of a swimming pool in which those characters have a competitive race (including water and course ropes in the pool and starting blocks). The lower LCD 14 displays a user character 1P'. Since the game screen is in the left-hander mode, the characters moves to the left in the game screen of FIG. 7.

In the left-hander mode as well, by touching the touch panel 22 with the stick 24 or the like at the position of a hand 1P'A of the only one character 1P' displayed on the lower LCD 14 and providing a counterclockwise rotary input to the touch panel 22 through the movement of the stick 24 or the like in the left-handed (counterclockwise) direction so as to draw a circle 70CC indicated by dotted lines, the image of the user character is changed in such a manner that the hand 1P'A rotates in keeping with the rotary input. Accordingly, the user character 1P' displayed in the entire game screen on the upper LCD 12 is changed so as to move to the left. The more quickly the rotary input is given with the stick 24 or the like, the higher the moving speed of the user character 1P' becomes, and thus the user character reaches fast the goal on the left of the entire game screen.

Figure 9:
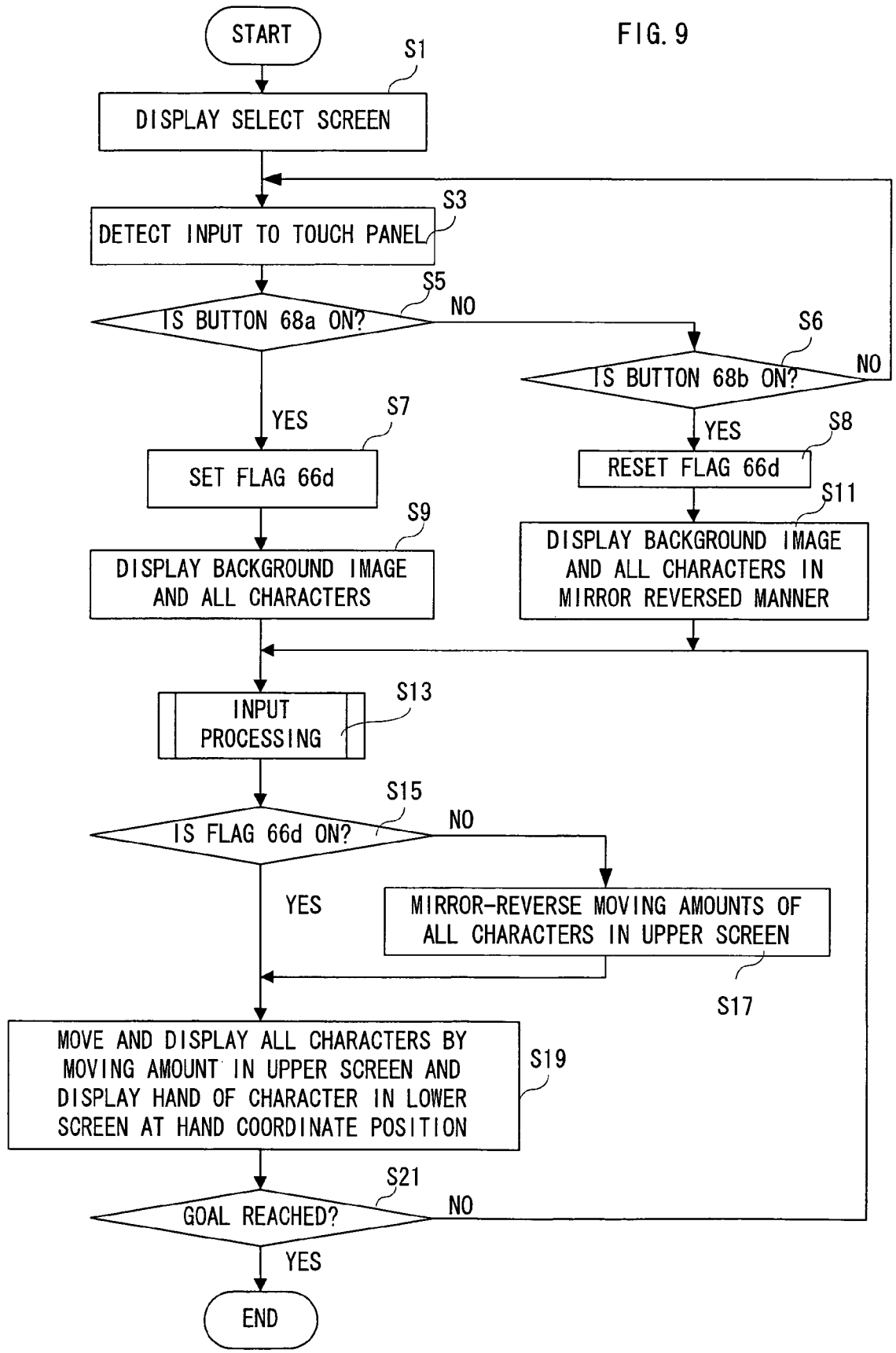
FIG. 9 is a flowchart showing a main process operation of the CPU core shown in FIG. 2.

Referring to FIG. 9 to FIG. 12, the operation or handling of the game apparatus of this embodiment are described in detail below. The main process program shown in FIG. 9 is loaded in the main process program storage area 64*a* of FIG. 3, and is executed in a predetermined cycle, a display frame cycle of the LCDs 12 and 14, for example.

More specifically, in first step S1 of FIG. 5, the CPU core 42 instructs the second GPU 52 to display an image of the mode select screen 68 shown in FIG. 4 on the second LCD 14. At that time, the GPU 52 operates according to the image generating program 64*b* and the image displaying program 64*c* in the program storage area 64 of the RAM 48 shown in FIG. 3, and displays the mode select screen 68 (FIG. 4) by using the image data 66*a* (the image data of the right-hander button 68*a* and left-hander button 68*b*) stored in the data storage area 66.

In succeeding step S3, the CPU core 42 uses the touch detecting program 64e (FIG. 3) to determine whether or not the stick 24 or the like has touched the touch panel 22, that is, whether or not the touch-off state has changed to the touch-on state. Additionally, the main process routine is repeatedly executed at predetermined time intervals as stated above. Therefore, step S3 functions as touch detecting means for detecting the presence or absence of a touch on the touch panel at the predetermined time intervals, as in the case of step S33 described later.

Then, if the change from the touch-off to the touch-on states is detected in step S3, the CPU core 42 determines in next step S5 whether or not the touch position of the stick 24 or the like at that time falls within the area of the graphic or image of the right-hander button 68a in the mode selecting screen 68 (FIG. 4), according to the touch position detecting program 64f of FIG. 3. That is, the CPU core 42 determines whether the right-hander button 68a is operated or not. If "YES", the CPU core 42, in succeeding step S7, sets the right-hander flag 66d shown in FIG. 3.

Subsequently, in step S9, the CPU core 42 displays a game screen (background image, all the characters and objects) shown in FIG. 5, according to the image generating program 64b, the image displaying program 64c, and the image changing program 64d, as previously described.

However, if having determined "NO" in step S5, that is, if having determined whether or not the left-hander button 68b is selected in the mode selecting screen 68 and concluded as "YES" in step S6, the CPU core 42 resets the right-hander flag 66d in next step S8. Then, in succeeding step S11, the CPU core 42 displays a game screen shown in FIG. 7, in a mirror reversed manner, and according to the image generating program 64b, the image displaying program 64c, and the image changing program 64d.

After step S9 or S11, the CPU core 42 performs an input processing step in step S13. The details of the input processing step are shown in FIG. 10 and FIG. 11.

Figure 10:
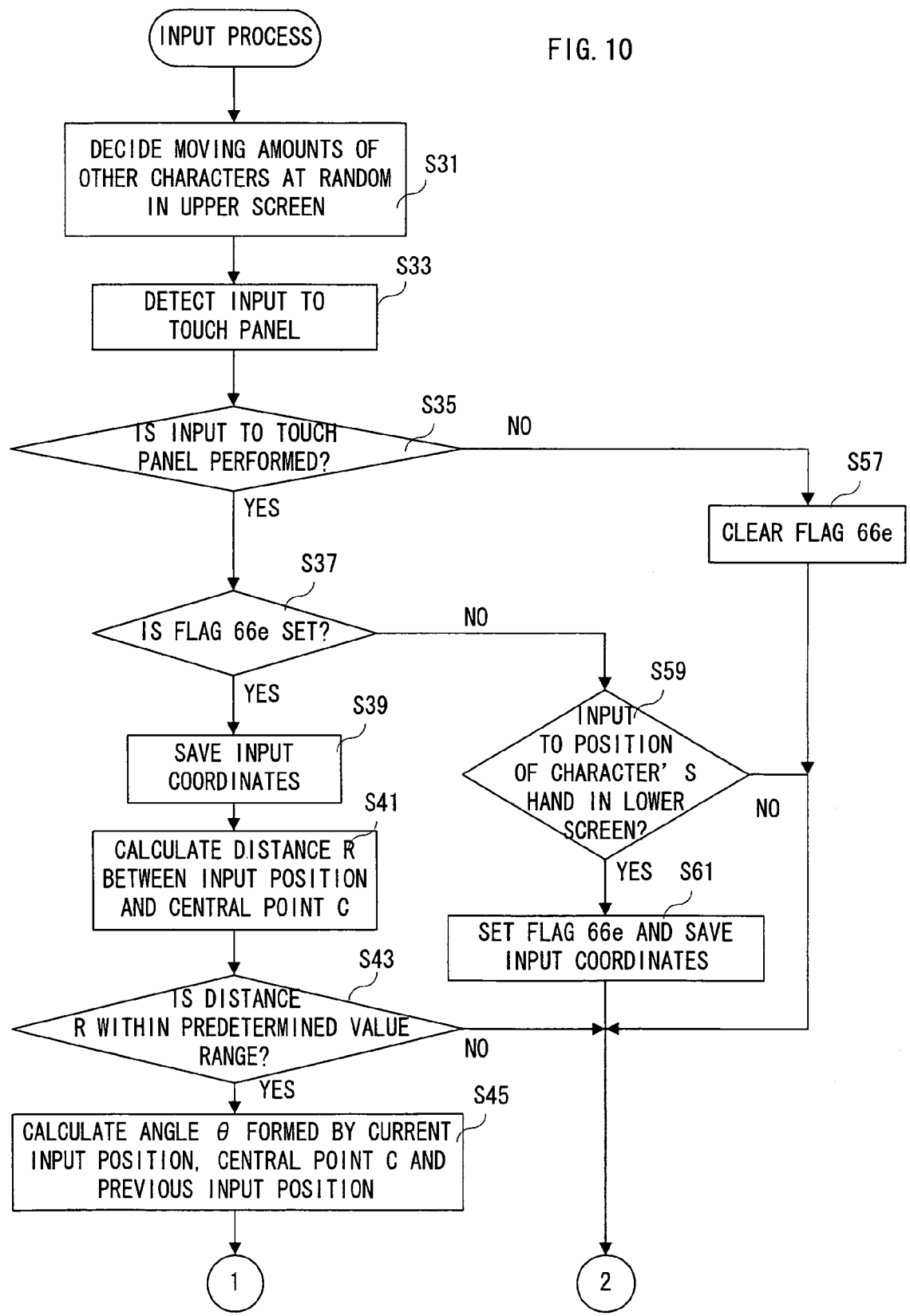
FIG. 10 is a flowchart showing the details of input process steps.
Figure 11:
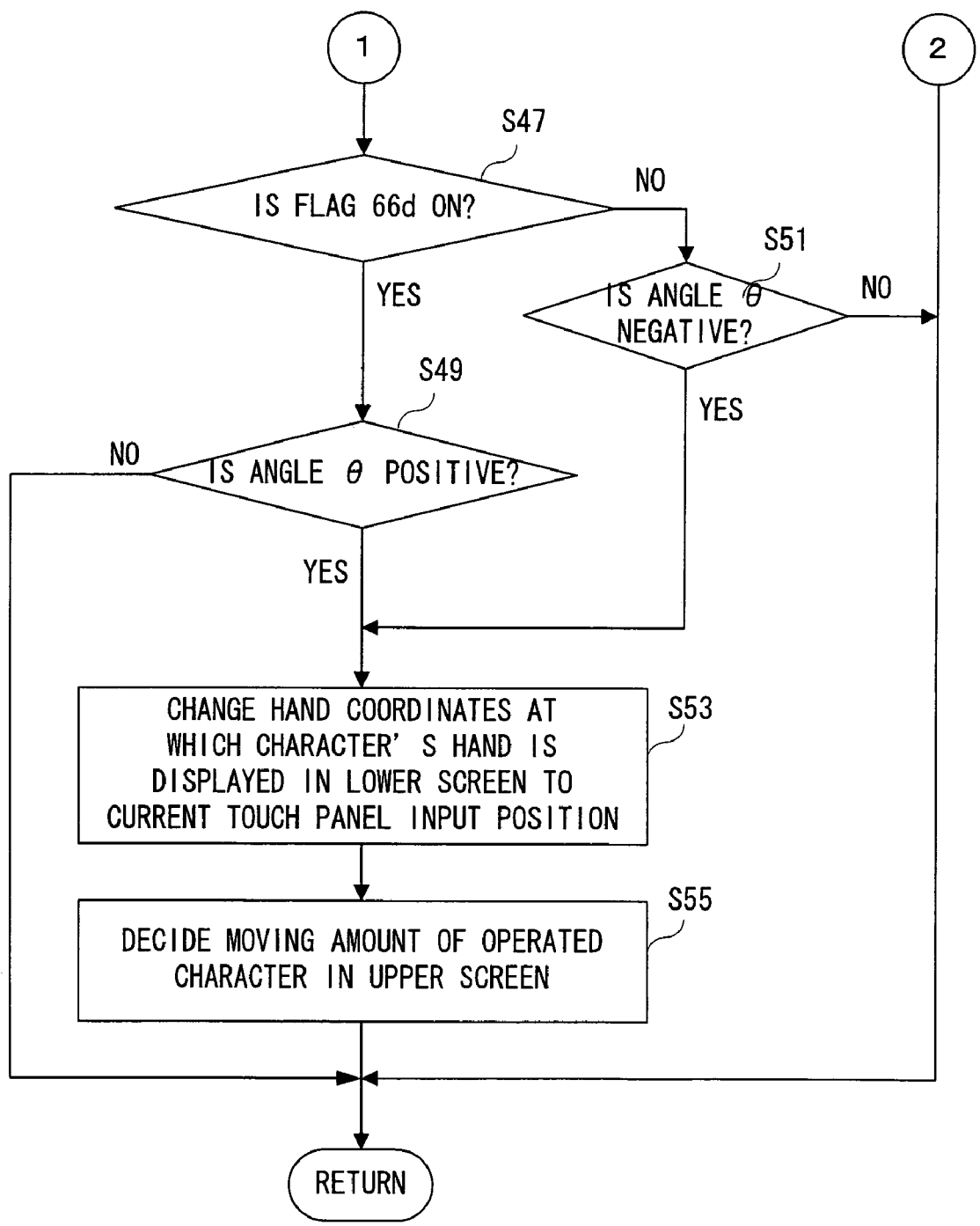
FIG. 11 is a flowchart showing the part of the input process steps continued from FIG. 10.

In first step S31 of FIG. 10, the CPU core 42 decides at random the moving amounts of the characters other than the user character 1P or 1P' (FIG. 5 or FIG. 7), in the upper screen, i.e., the game screen displayed on the upper LCD 12.

Then, in succeeding step S33, the CPU core 42 detects a touch input through the stick 24 or the like, as in the case with step S3 (FIG. 9). Then, in step S35, the CPU core 42 determines whether a touch input has been performed or not.

If concluded in step S35 that the touch input has been performed, the CPU core 42 determines in step S37 whether the input-in-progress flag 66e of FIG. 3 is already set, that is, continuous inputs are being performed.

If concluded as "YES" in the both steps S35 and S37, the CPU core 42, in succeeding step S39, detects the coordinates of the touch position at the time according to the touch position detecting program, and stores the input position coordinates temporarily in the coordinate/angle data storage area 66c of FIG. 3.

Steps S39 to S55 (FIG. 11) are the processes of determining whether continuous touch inputs through the stick 24 or the like have drawn the circular arc path 70C (FIG. 6) in the right-handed (clockwise) direction or have drawn the circular arc path 70CC (FIG. 8) in the counterclockwise direction. That is, by performing steps S39 to S55, the CPU core 42 determines whether the continuous touch inputs have drawn a path in the first direction (right-handed or clockwise) or have drawn a path in the second direction (left-handed or counterclockwise) different from the first direction.

Figure 12:
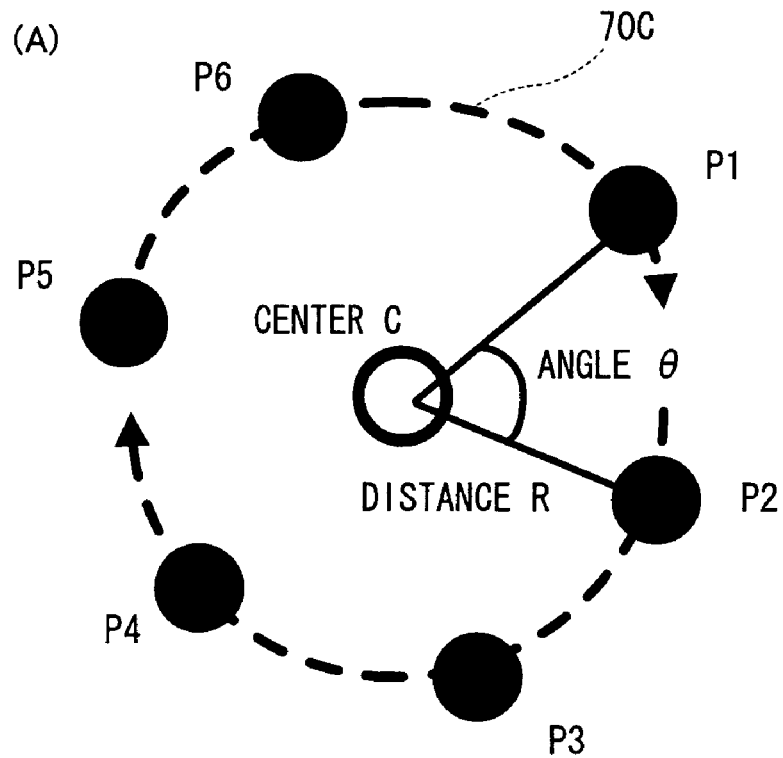
FIG. 12 includes illustrative views showing methods of determining circular arc paths resulting from continuous inputs.
Figure 12:
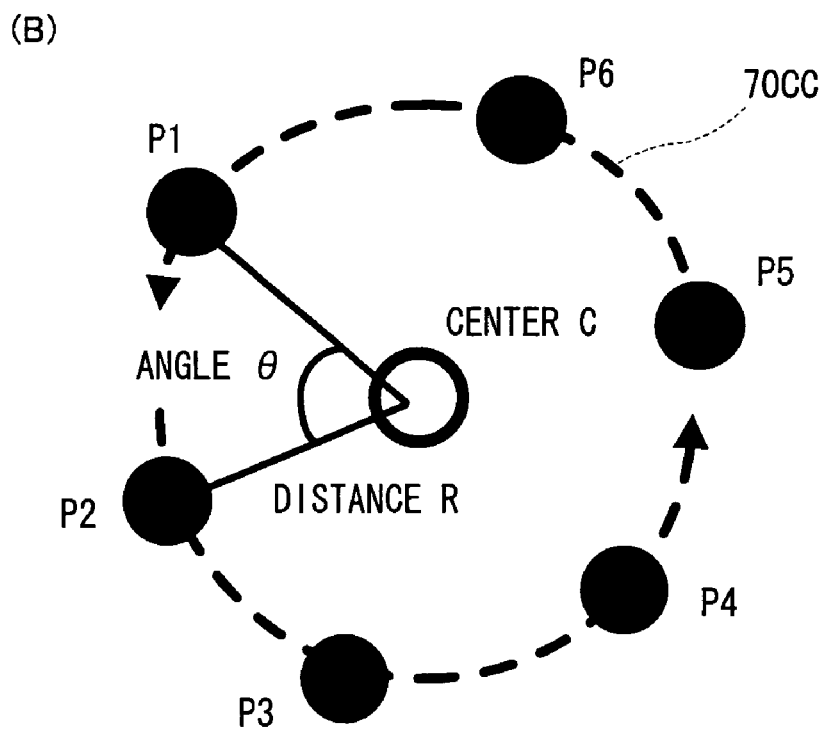

Referring to FIG. 12, FIG. 12 (A) is an illustrative view for determining whether or not continuous inputs have been performed so as to draw a path in the first direction, and FIG. 12 (B) is an illustrative view for determining whether or not continuous inputs have been performed so as to draw a path in the second direction.

In FIG. 12 (A), the CPU core 42 determines whether or not touch inputs have been performed in order of point P1, point P2, point P3, point P4, point P5, and point P6. A center C denotes a central position of the arm 1PA (FIG. 6). In brief, if a touch input has been performed from the point P1 to the point P2, the CPU core 42 determines whether or not a distance R between the point P2 and the center C falls within a predetermined range. If the distance R is within the predetermined range, the CPU core 42 calculates an angle θ formed by the current input point P2, the central point C and the previous input point P1. If the angle θ is positive (right-handed direction), the CPU core 42 concludes that the rotation, i.e. the right-handed circular path 70C is correctly input.

However, if the angle θ is negative (left-handed direction), the CPU core 42 concludes that the left-handed circular arc path 70CC of FIG. 12 (B) is correctly input.

Returning to FIG. 10, in order to determine whether continuous inputs have been performed so as to draw a path in the first direction or continuous inputs have been performed so as to draw a path in the second direction, the CPU core 42, after saving input coordinates in the coordinate data storage area 66b in the previous step S39, calculates the distance R between the input coordinate position and the center C (FIG. 12) in next step S41. The data on the distance R of the contents is temporarily held in the distance/angle data storage area 66c shown in FIG. 3. Then, the CPU core 42, in step S43, determines whether or not the calculated distance R falls within a predetermined value range, that is, whether or not the distance R does not considerably deviate from the range. Then, "YES" is concluded in step S43, the CPU core 42 calculates the angle θ (FIG. 12) formed by the current input position, the central point C and the previous input position in next step S45. Based on the assumption that the current input position is P2 and the previous input position is P1, the angle θ is an angle formed by P1-C-P2. When calculating the angle θ in step S45, the CPU core 42 holds temporarily the angle data in the coordinate/angle data storage area 66c of FIG. 3.

After that, when the process moves to step S47 of FIG. 11, the CPU core 42 determines whether or not the right-hander flag 66d is on, that is, whether or not the right-hander button 68a was selected in the previous mode select screen. If "YES" is concluded in step S47, that is, if the right-hander mode is selected, the CPU core 42 determines whether the value of the angle θ previously calculated and stored in the area 66c is positive (plus) or not in next step S49.

Additionally, if "NO" is determined in step S47, this means that the left-hander mode is selected. Thus the CPU core 42 determines in next step S51 whether the value of the angle θ is negative (minus) or not. If the left-hander mode is selected and the angle data value is negative, this is a wrong operation. Thus, if "NO" was determined in step S51, the process is returned directly to step S15 of FIG. 9. If the right-hander mode is selected and the angle data value is not positive, this is a wrong operation. If "NO" was determined in step S49, the process is returned directly to step S15 of FIG. 9.

If "YES" is determined in both steps S47 and S49, this means that the touch input operations have been correctly performed by the stick 24 or the like. In this case, the process moves to next step S53.

Additionally, if "NO" was determined in step S47, this means that the left-hander mode is selected. Thus, the CPU core 42 determines in next step S51 whether the value of the angle θ is negative (minus) or not. If the left-hander mode is selected and the angle data value is not negative, this is a wrong operation. Therefore, if "NO" was determined in step S51, the process is returned directly to step S15 of FIG. 9.

However, if "NO" was determined in step S47 and "YES" was determined in step S51, this means that the touch input operations have been correctly performed. In this case, the process proceeds to next step S53. That is, steps S47 and S51 constitute the second determining means.

In step S53, the CPU core 42 changes the coordinates (hand coordinates) for displaying the hand or arm 1PA or 1P'A of the user character 1P or 1P' (FIG. 6 or FIG. 8) to the current touch panel input position saved in step S39, in the lower screen, that is, in the game screen displayed on the LCD 14. This is for the purpose of displaying the hand 1PA or 1P'A in the current input position (FIG. 12: P2).

Then, in next step S55, the CPU core 42 decides the moving amount of the user-operated character 1P or 1P' in the upper screen, that is, in the game screen (the entire game screen) displayed on the LCD 12. The moving amount is basically decided as a function of the angle θ. That is, as stated above, the detection of touch position on the touch panel 22 (step S33) is carried out in a predetermined cycle. If the detected value of the angle θ is high, this means that there is a large difference between the touch input positions in the predetermined cycle (for example, a difference between P2 and P1 in FIG. 12). This also indicates that the moving amount of the stick 24 or the like (the displacement amount) is large in a predetermined time. In other words, the stick 24 or the like was rotated quickly on the touch panel 22 in order to draw the circular arc path 70C or 70CC. Therefore, in this exemplary embodiment, the moving amount of the user character 1P or 1P' is decided in proportion to the rotation speed of the stick 24 or the like on the touch panel 22. That is, the more quickly the stick 24 or the like is rotated, the larger the moving amount of the user character (in the predetermined cycle) becomes.

Additionally, the manner of deciding the position of the hand in step S53 and the manner of deciding the moving speed of the user character in step S55 are common in the right-hander mode and the left-hander mode. Therefore, in either case where a path input operation in the first direction (clockwise) is performed in the first mode (right-hander mode) or where a path input operation in the second direction (counterclockwise) is performed in the second mode (left-handed mode), steps S53 and S55 are carried out in the same manner. More specifically, these steps S53 and S55 function as game process means for executing the common game process regardless of the result of determination by the first determining means or the result of determination by the second determining means.

After "NO" was determined in step S35 of FIG. 10, this means that no touch input has been performed. Thus, the CPU core 42 clears or resets the input-in-progress flag 66e and returns the process to step S15 of FIG. 9.

Additionally, if "NO" was determined in step S37 of FIG. 10, that is, if the touch input was performed but the input-in-progress flag 66e was not yet set at the time, the CPU core 42 determines in step S59 whether or not the touch position at that time matches the position of the hand or arm 1PA or 1P'A of the user character 1P or 1P' (FIG. 6 or FIG. 8) in the lower screen, e.g., in the game screen displayed on the lower LCD 14. If "YES" was determined in step S59, this means that the touch input through the stick 24 or the like is an input operation for rotating the hand 1PA or 1P'A. In that case, the CPU core 42, in next step S61, sets the input-in-progress flag 66e and saves the data on the input coordinate position at that time in the coordinate data storage area 66b (FIG. 3), as in the case of the previous step S39, in order to treat the following input operations as continuous inputs. However, if the process passed through step S61, this means that the input operation at that time is a first one of the continuous input operations. Thus, after step S61, the process is returned directly to step S15 (FIG. 9).

In step S15 of FIG. 9, the CPU core 42 determines whether the right-hander flag 66d (FIG. 3) is set or not in order to ascertain whether the right-hander mode is selected or the left-hander mode is selected. If "NO" was determined in step S15, this means that the left-hander mode is selected. Thus, the CPU core 42, in next step S17, reverses (decodes) the moving amounts of all the characters in the upper screen (the game screen displayed on the LCD 12). Then, after the reversal of the moving amounts in step S17, or if "YES" was determined in step S15, that is, if the right-hander mode is selected, the process moves directly to next step S19.

Step S19 equates to a game screen processing means. That is, step S19 based on the determination result of "YES" in step S15, is performed as a game screen display means in the right-hander mode. Step S19 after step S17 is performed as a game screen display means in the left-hander mode.

Then, the CPU core 42, in step S19, moves all the characters in the upper screen (the entire game screen on the LCD 12) according to the moving amounts reversed in step S17 or the moving amounts decided in step S55, and also displays the hand or arm 1PA or 1P'A of the user character 1P or 1P' at the position of the hand coordinates changed in step S53, in the lower screen (the individual game screen on the LCD 14). In this manner, at the swimming competitive game of this embodiment, the user moves his/her character by operating the stick 24 or the like so as to draw a continuous circular arc path, for example, on the touch panel, at the moving speed in proportion to the speed of the circular movement.

Then, in final step S21, the CPU core 42 determines whether or not any of the characters in the game screen on the LCD 12 has reached the goal (on the right side in the right-hander mode or on the left side in the left-hander mode). If any of the characters has entered the goal, this means that the game is over and thus the main process is terminated. If not, step S13 and the following ones, e.g., the input processing steps shown in FIG. 10 and FIG. 11 are further repeatedly performed.

In the above mentioned exemplary embodiment, assuming that the path drawn by continuous position inputs is a circular arc path, it is determined whether or not the circular arc path 70C or 70CC has been drawn by the stick 24 or the like, and then the game progresses according to the result of the determination. Alternatively, instead of a circular arc or a circle, such a diagonal line as shown in FIG. 13 is possible as a path drawn by continuous position inputs.

Figure 13:
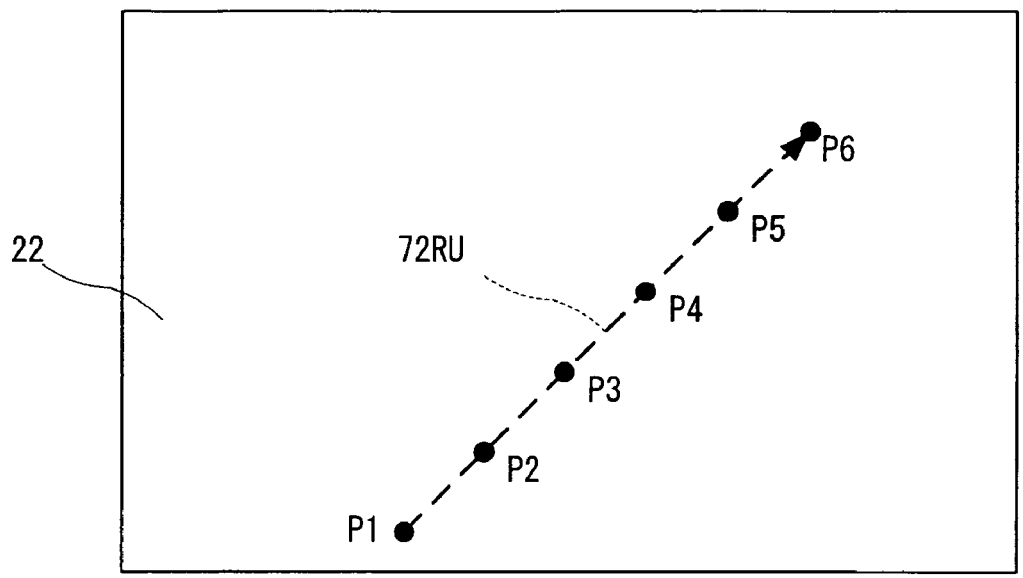
FIG. 13 includes illustrative views showing examples of oblique-line paths resulting from continuous inputs.
Figure 13:
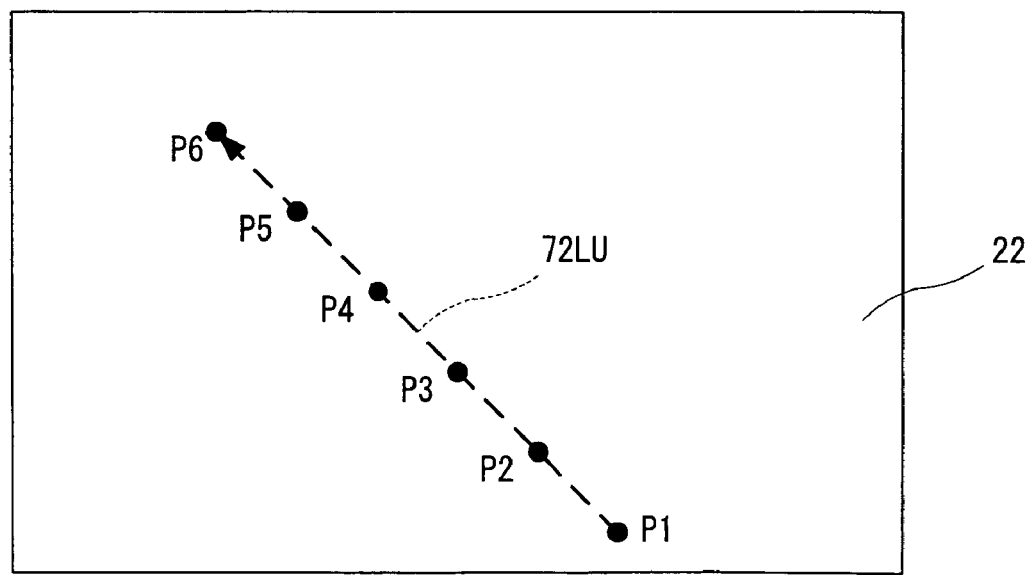

Calculated in the example of FIG. 13 (A) are axial increment values in the X-axis direction and the Y-axis direction from the previous input position P1 to the current input position P2 are calculated. If these values fall within a predetermined error range, it is determined that a right-upward diagonal line 72LU has been properly drawn.

Additionally, although not shown, a path drawn by continuous position inputs may be arbitrarily changed in shape.

Additionally, in the above described exemplary embodiment, the touch panel provided to the display device is employed as one example of a pointing device. However, certain exemplary embodiments are applicable to the case of using another pointing device such as a mouse because continuous input operations can be also performed by that pointing device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus for playing a game program equipped with a display for displaying a game screen and having a pointing device associated therewith for drawing a path by continuously designating different positions in said game screen, comprising:
    select screen displaying programmed logic circuitry that displays on said display a select screen for selecting one input mode from either a first input mode or a second input mode of the game program;
    first determining programmed logic circuitry for, when said first input mode is selected, determining whether or not a path extending in a first direction is drawn by said pointing device;
    second determining programmed logic circuitry for, when said second input mode is selected, determining whether or not a path extending in a second direction different from said first direction is drawn by said pointing device; and
    game process programmed logic circuitry for executing a common game process in accordance with a result of determination by said first determining programmed logic circuitry or a result of determination by said second determining programmed logic circuitry.

2. A game apparatus according to claim 1, further comprising game screen displaying programmed logic circuitry for displaying a first game screen on the display when said first input mode is selected and displaying a second game screen on the display when said second input mode is selected.

3. A game apparatus according to claim 1, wherein said first input mode is a right-handed input mode and said second input mode is a left-handed input mode.

4. A game apparatus according to claim 3, wherein the path extending in said first direction is a right-handed circular arc path and the path extending in said second direction is a left-handed circular arc path.

5. A game apparatus according to claim 1, wherein said pointing device includes a touch panel provided to said display.

6. A non-transitory storage medium storing a game program for a game apparatus equipped with a display for displaying a game screen and having a pointing device associated therewith for drawing a path by continuously designating different positions in said game screen, wherein said program allows a game processor to:
    display on said display a select screen for selecting one input mode from either a first input mode or a second input mode of the game program;
    determine, when said first input mode is selected, whether or not a path extending in a first direction is drawn by said pointing device;
    determine, when said second input mode is selected, whether or not a path extending in a second direction different from said first direction is drawn by said pointing device; and
    execute a common game process in accordance with a result of the determinations.

7. A storage medium according to claim 6, wherein said program further allows the game processor to display a first game screen on the display when said first input mode is selected and to display a second game screen on the display when said second input mode is selected.

8. A storage medium according to claim 6, wherein said first input mode is a right-handed input mode and said second input mode is a left-handed input mode.

9. A storage medium according to claim 8, wherein the path extending in said first direction is a right-handed circular arc path and the path extending in said second direction is left-handed circular arc path.

10. In a game apparatus equipped with a display for displaying a game screen and having a pointing device associated therewith for drawing a path by continuously designating different positions in said game screen, a method of playing a game program, said method comprising:
    displaying on said display a select screen for selecting one input mode from a first input mode or a second input mode of the game program;
    determining, when said first input mode is selected, whether or not a path extending in a first direction is drawn by said pointing device via at least one processor of the game apparatus;
    determining, when said second input mode is selected, whether or not a path extending in a second direction different from said first direction is drawn by said pointing device via the at least one processor; and
    executing a common game process using the at least one processor in accordance with a result of the determinations.

11. A method according to claim 10, further comprising displaying a first game screen on the display when said first input mode is selected and displaying a second game screen on the display when said second input mode is selected.

12. A method according to claim 10, wherein said first input mode is a right-handed input mode and said second input mode is a left-handed input mode.

13. A method according to claim 12, wherein the path extending in said first direction is a right-handed circular arc path and the path extending in said second direction is a left-handed circular arc path.

14. A game apparatus equipped with a display for displaying a game screen and using a pointing device for drawing a path by continuously designating different positions in said game screen, comprising:
    a select screen displaying means for displaying on said display a select screen to select a one input mode from either a right-handed input mode or a left-handed input mode;
    a detecting means for detecting coordinates input by said pointing device;
    a determining means for determining whether or not a predetermined path is input on the basis of the coordinates continuously detected by said detecting means; and
    a game processing means for executing predetermined game processing when said determining means determines that said predetermined path is input, wherein
    said determining means determines whether or not a diagonally right upward path is input as said predetermined path when said right-handed input mode is selected, and determines whether or not a diagonally left upward path is input as said predetermined path when said left-handed input mode is selected.

15. A game apparatus according to claim 14, further comprising a game screen displaying means for displaying a first game screen on said display when said right-handed input mode is selected and a second game screen on said display when said left-handed input mode is selected, wherein
    said first game screen and said second game screen are images horizontally flipped from side to side.

16. A game apparatus according to claim 14, wherein said determining means performs said determination by calculating an angle formed by the coordinates currently detected by said detecting means and coordinates previously detected by said detecting means by taking predetermined coordinates as a base point.

17. A game apparatus according to claim 16, wherein said determining means performs said determination on the basis of a precondition that a distance between the coordinates detected by said detecting means and said predetermined coordinates falls within a preset range.

18. A game apparatus according to claim 14, wherein said game apparatus further causes a processor to execute a game screen displaying step for displaying a first game screen on said display when said right-handed input mode is selected and displaying a second game screen on said display when said left-handed input mode is selected, and said first game screen and said second game screen are images horizontally flipped from side to side, and said game processing means executes moving processing of a user character to thereby move, in response to said determining means determining means that said predetermined path is input by, said user character to a right direction on said display in a case that said right-handed input mode is selected and moves said user character to a left direction on said display in a case that said left-handed input mode is selected.

19. A game apparatus according to claim 18, wherein said game processing means increases an amount of movement of said user character as an input speed of said path calculated on the basis of the coordinates continuously detected by said detecting means increases.

20. A controlling method in a game apparatus equipped with a display for displaying a game screen and using a pointing device for drawing a path by continuously designating different positions in said game screen, including:

a select screen displaying step for displaying on said display a select screen to select one input mode from either a right-handed input mode and a left-handed input mode;

a detecting step for detecting coordinates input by said pointing device;

a determining means for determining whether or not a predetermined path is input on the basis of the coordinates continuously detected by said detecting step; and a game processing step for executing predetermined game processing when said determining step determines that said predetermined path is input, wherein said determining step determines whether or not a clockwise path is input as said predetermined path when said right-handed input mode is selected, and determines whether or not a counterclockwise path is input as said predetermined path when said left-handed input mode is selected.

21. A controlling method of a game apparatus equipped with a display for displaying a game screen and using a pointing device for drawing a path by continuously designating different positions in said game screen, the method comprising:

displaying on said display a select screen to select one input mode from either a right-handed input mode or a left-handed input mode;

detecting coordinates input by said pointing device;

determining whether or not a predetermined path is input on the basis of the coordinates continuously detected by said detecting; and executing predetermined game processing when said determining determines that said predetermined path is input, wherein said determining determines whether or not a diagonally right upward path is input as said predetermined path when said right-handed input mode is selected, and determines whether or not a diagonally left upward path is input as said predetermined path when said left-handed input mode is selected.

* * * * *